Oct. 28, 1941.
R. A. MILLER
2,261,035
PRESSURE RELIEF DIAPHRAGM
Filed Nov. 10, 1938
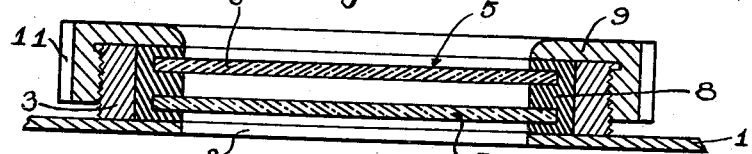
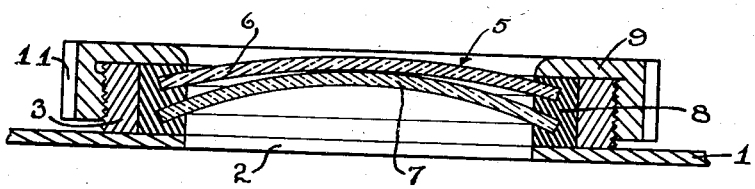
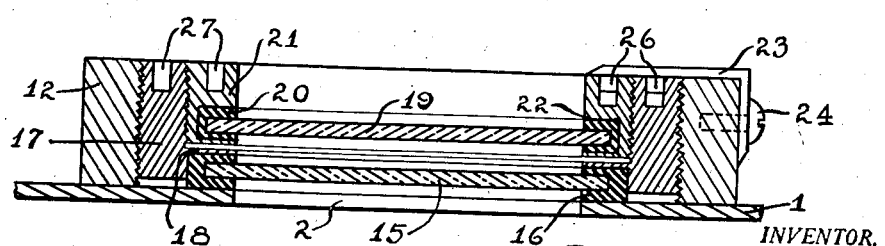
INVENTOR.
ROBERT A. MILLER
BY Bradley & Bee
ATTORNEYS.

Patented Oct. 28, 1941

2,261,035

UNITED STATES PATENT OFFICE 2,261,035

PRESSURE RELIEF DIAPHRAGM

Robert A. Miller, Tarentum, Pa., assignor to Pittsburgh Plate Glass Company, Allegheny County, Pa., a corporation of Pennsylvania Application November 10, 1938, Serial No. 239,828

2 Claims. (Cl. 220—89)

The present invention relates to pressure relief diaphragms and more particularly to diaphragms in which the rupture of glass plates permits an instantaneous release of the pressures ordinarily restrained by the diaphragms.

The primary object of the present invention is the provision of a pressure relief diaphragm which will be particularly resistant to deterioration by oil, acid, or other chemical agents and which shall, at the same time, have a regulable point of rupture.

Other objects and advantages of the invention will become more apparent from the following detailed description of certain preferred embodiments thereof.

The problem of venting extraordinary pressures developed in closed containers or systems has long confronted the industry. One of the first suggestions was the provision of a valve in the system through which the gas or liquid contained therein could be by-passed or blown to the atmosphere in order that the pressure in the system could be reduced. Obviously such provision required the presence of an operator at all times and a constant watch of the pressure indicators. The inevitable result of this was the creation of semi-automatic or fully automatic relief valves by means of which a definite pressure could be maintained in a system. Any excess in this pressure would deflect a diaphragm to close an electric circuit or operate an air valve which would in turn open an exhaust valve through which the fluid under pressure would escape. When the pressure again returned to the desired point, the diaphragm would resume its initial position, breaking the contact or closing the air valve and also the exhaust valve.

In certain instances, however, the nature of the chemicals contained in the system was such that it was desirable to provide for an immediate and rapid venting when extraordinary pressures were created without a time lag incidental to the operation of a valve. Accordingly, provision was made to incorporate a vent opening of considerable size in the container, which was closed by a safety disc designed to rupture at a definite pressure. Foils or thin sheets of nickel, aluminum, lead, etc. were used for this purpose. The thickness of the sheet generally controlled the amount of pressure to which the safety disc could be exposed without rupture. Metallic safety discs, however, upon exposure to various chemicals deteriorated and were thus susceptible to rupture at even lower pressures than those for which they were calibrated.

It, therefore, became desirable to replace the metallic discs with plates of other material which would be more resistant to corrosion. The most readily adaptable and available substance was glass, but it was discovered that there was usually a wide variation in the breaking points of glass plates. To overcome this difficulty there was developed auxiliary means in which a heavy glass capable of withstanding pressures considerably in excess of the expected pressures was ruptured by the impact of a striking arm controlled to function at the maximum desired pressure. This system, however, entailed the addition of relatively delicate mechanism to the system and did not meet with wide-spread success.

Briefly stated, the present invention takes advantage of the corrosion resistance of glass and by using a pair of spaced glass plates permits the creation of a relief diaphragm, which will rupture at a definite ascertainable pressure.

In the drawing illustrating the invention, wherein like numerals are used to designate like parts throughout the same:

Figure 1 is a vertical sectional view of a relief diaphragm constructed in accordance with the provisions of the invention.

Figure 2 is a vertical sectional view of a diaphragm under pressure.

Figure 3 is a vertical sectional view of a diaphragm under pressure approaching maximum, and Figure 4 is a vertical sectional view of a construction including another form of the invention.

Referring to the drawing, a closed container or pressure vessel 1 is provided with a vent opening 2 of any suitable size. A circular collar 3 of substantially greater diameter than the opening 2 is secured outwardly thereof to the tank 1, as for example, by welding. A relief diaphragm 5 comprising glass plates 6 and 7 supported in spaced relation by a spacing strip 8 of resilient material, such as cork impregnated with asphalt, rubber, or synthetic resinous composition is positioned within the collar 3 and secured therein by means of a cap 9, threaded to engage the collar 3. Spanner slots 11 formed in the outer edge of the cap 9 permit the cap to be screwed into position more readily.

When the pressure within the container 1 is normal, the glass plates 6 and 7 will be in substantially parallel relation, as shown in Figure 1. An increase in the pressure within the container will cause the glass plate 7 to deflect outwardly, as shown in Figure 2, until it contacts the plate 6. A further increase in pressure causes a partial outward deflection of the plate 6 which movement is continued until the plate 7 reaches its ultimate breaking deflection. Upon the rupture of the plate 7, the plate 6 immediately breaks and the extraordinary pressures developed in the container 1 are released.

The successful operation of this relief diaphragm is due to the arrangement of the glass plates. The plates are spaced so that the maximum deflection of the plate 7 shall not be reached until after it has made contact with the plate 6. When this contact is attained the outer plate 6 will support a part of the pressure developed within the container 1 and reinforce the inner plate 7 to such an extent that the inner plate may withstand greater pressures without reaching its ultimate breaking deflection.

It will be observed that the diaphragm to be effective for the desired purpose requires the conjoint action of both glass plates. Neither plate alone is able to withstand the pressure developed in the container 1, but where the outer plate reinforces the inner plate to retard the gradual deflection thereof, the diaphragm holds until the maximum pressure desired is reached. At the same time when either plate ruptures by attainment of its ultimate breaking deflection, the other plate will also be ruptured. Accordingly a combination of glass plates of proper thicknesses selectively spaced permits the formation of a diaphragm which will rupture at a predetermined pressure, variable within considerably widespread limits.

In the construction illustrated in Figure 4, there is provided means for separately installing the glass plates in the diaphragm and also for regulating the space between the assembled plates. A circular collar 12, threaded along its inner periphery, is secured to the tank 1 around the opening 2. An inner glass plate 15 seated in an annular ring 16 of resilient material, is positioned within the collar 12 and spaced circumferentially therefrom. A clamping ring 17, provided with an inwardly-extending flange 18 projecting a distance sufficient to engage the ring 16 is threaded in the collar 12 and serves to lock the plate 15 into position. A second glass plate 19 embedded in an annularly-disposed body 20 of resilient material is mounted in an annular ring 21, recessed as indicated at 22 to form a seating portion for enclosing the body 20. The ring is threaded into the clamping ring 17. Since the pressure within the tank 1 exerts an outwardly-directed force against the plate 15, there is little possibility of displacement of the diaphragm, but provision is made for clamping positively the assembly. A locking plate 23 substantially of L shape in cross section can be secured to the collar 12 by means of a plurality of screws 24. The locking plate 23 is provided with downwardly-projecting lugs 26 adapted to engage in openings 27 formed in the upper sides of the rings 17 and 21. This construction permits the second glass plate 19 to be spaced and held at any desired distance from the inner plate 15. The underlying principles upon which the successful operation of the diaphragm is predicated does not differ from that previously described.

It will at once be obvious that various modifications in the arrangement and comparative sizes of the component parts and their manner of mounting may be had without departing from the spirit of the invention or the scope of the appended claims.

What I claim is:

1. In combination in apparatus for relieving extraordinary pressures developed in a fluid container, a collar secured around a vent provided in the fluid container, a glass plate yieldable and breakable in response to fluid pressure positioned within the collar and held annularly against displacement therefrom, and a second glass plate, yieldable and breakable, positioned in and held annularly against displacement from the collar in contiguous spaced relation to the first glass plate, the distance between the plates being less than the deflection of the inner plate upon maximum yielding whereby the first plate is movable in response to fluid pressure into reinforcing contacting relation with the second plate.

2. In combination in apparatus for relieving at a definite ascertainable pressure extraordinary pressures developed in a closed container, a circular collar secured around a vent provided in the container, a glass plate yieldable and breakable in response to fluid pressure positioned within the collar and held annularly against displacement therefrom, and a second glass plate, yieldable and breakable, positioned in and held annularly against displacement from the collar in contiguous spaced relation to the first glass plate, the distance between the plates being less than the deflection of the inner plate upon maximum yielding whereby the first plate is movable in response to fluid pressure into reinforcing contact with the second plate, the glass plates being characterized in that either alone will rupture at a pressure below that at which the two plates when in reinforcing relation will rupture.

ROBERT A. MILLER.